INVENTOR.
ROBERT W. STANECK
BY H. Talman Dybvig
His Attorney

Feb. 26, 1963 R. W. STANECK 3,079,071

PUNCH MECHANISM

Filed Feb. 19, 1960 5 Sheets-Sheet 2

INVENTOR.
ROBERT W. STANECK
BY H. Talmun Dybvig
His Attorney

Feb. 26, 1963 R. W. STANECK 3,079,071

PUNCH MECHANISM

Filed Feb. 19, 1960 5 Sheets-Sheet 3

INVENTOR.
ROBERT W. STANECK
BY H. Talman Dybvig
His Attorney

INVENTOR.
ROBERT W. STANECK
BY H. Talman Dybvig
His Attorney

Feb. 26, 1963

R. W. STANECK 3,079,071

PUNCH MECHANISM

Filed Feb. 19, 1960

5 Sheets-Sheet 5

INVENTOR.
ROBERT W. STANECK
BY H. Talman Dybvig
His Attorney

United States Patent Office 3,079,071

Patented Feb. 26, 1963

3,079,071

PUNCH MECHANISM

Robert W. Staneck, Lebanon, Ohio, assignor to The Standard Register Company, a corporation of Ohio Filed Feb. 19, 1960, Ser. No. 9,802
12 Claims. (Cl. 234—61)

This invention relates to a card punching mechanism and more particularly to an improved mechanism for serially punching successive cards; however, the invention is not necessarily so limited.

Punched cards are used in numerous business systems and in information storage systems. Characteristically, these cards are punched with apertures selected from an orderly array such that the presence or absence of an aperture conveys specific information. As one example, bank drafts may be provided with a punched code which may include a serial number identifying the draft as one of a specific series of drafts, information identifying a specific bank on which the draft is drawn, and information to be used in the internal bookkeeping system of the specific bank involved. After this pre-coded draft is circulated in ordinary business channels then returned to the bank, it is inserted into automatic processing equipment which decodes the information punched on the draft. Thereafter, the draft may be automatically classified and integrated into the internal bookkeeping system for the particular bank involved.

Successful operation of a system such as this may require hundreds of thousands of serially punched cards or drafts. Thus, apparatus for serially punching the cards is required, and if the system is to effect the intended economy, serial punching apparatus which can operate at high speeds is needed.

An object of the present invention is to provide an improved apparatus for serially punching code information on cards or the like which is capable of serially punching successive cards at high speed.

Another object of this invention is to provide a low inertia interposer mechanism for use in association with a punch mechanism, the interposer mechanism consecutively selecting punch elements from an orderly array to effect serial punching.

A further object of this invention is to provide an interposer mechanism for consecutively selecting punch elements from an orderly array for the purpose of serially punching cards or the like, the interposer mechanism operating continuously in a given direction with no requirement for a reverse operation to reset the interposer mechanism.

Other objects and advantages reside in the construction of parts, the combination thereof, the method of manufacture and the mode of operation, as will become more apparent from the following description.

Figure 1:
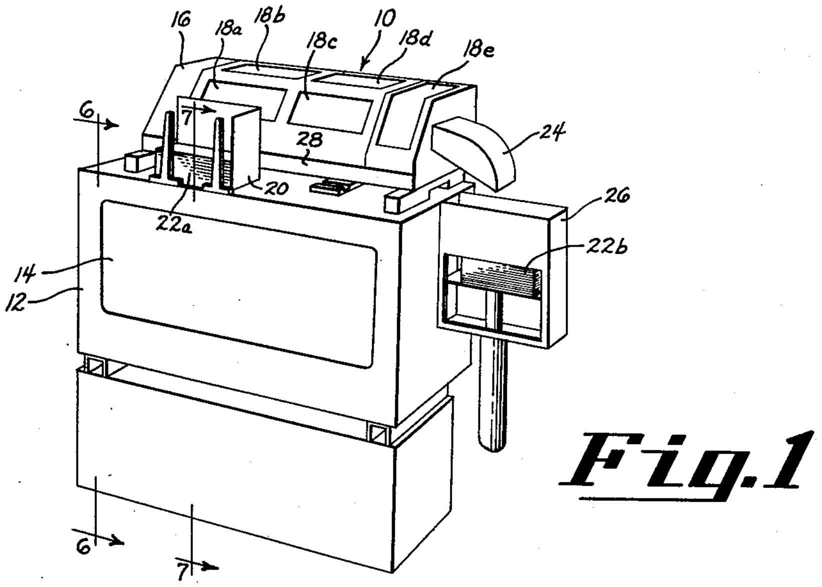
FIGURE 1 is a perspective view illustrating a cabinet housing the punch mechanism and associated interposer means which is the subject of the present invention.

Referring to the drawings in detail, a cabinet structure 10 housing the punch or impression mecahnism which is the subject of this invention is illustrated in FIGURE 1. This cabinet structure includes an enclosed base portion 12 having a removable panel 14 affording access to the interior of the cabinet for purposes of inspection and repair. Hingedly mounted on top of the base portion 12 is a dust cover 16 which also affords access to parts of the punch mechanism housed in the cabinet 10. As will become more apparent from the description which follows, the dust cover 16 affords access to the punch mechanism so that manual adjustments may be made in the coded information being punched by the mechanism. Observation windows 18*a*, 18*b*, 18*c*, 18*d*, and 18*e* permit inspection of the operation of a punch mechanism.

A magazine 20 mounted on the base portion 12 supports a plurality of cards 22*a* which are to be punched. Mechanism, a detailed description of which is not essential to a full understanding of the present invention, is included in the cabinet 10 for feeding the cards 22*a* successively through the punch mechanism. The punched cards 22*b* on emerging from the punch mechanism pass through a chute 24 into a magazine 26.

Figure 3:
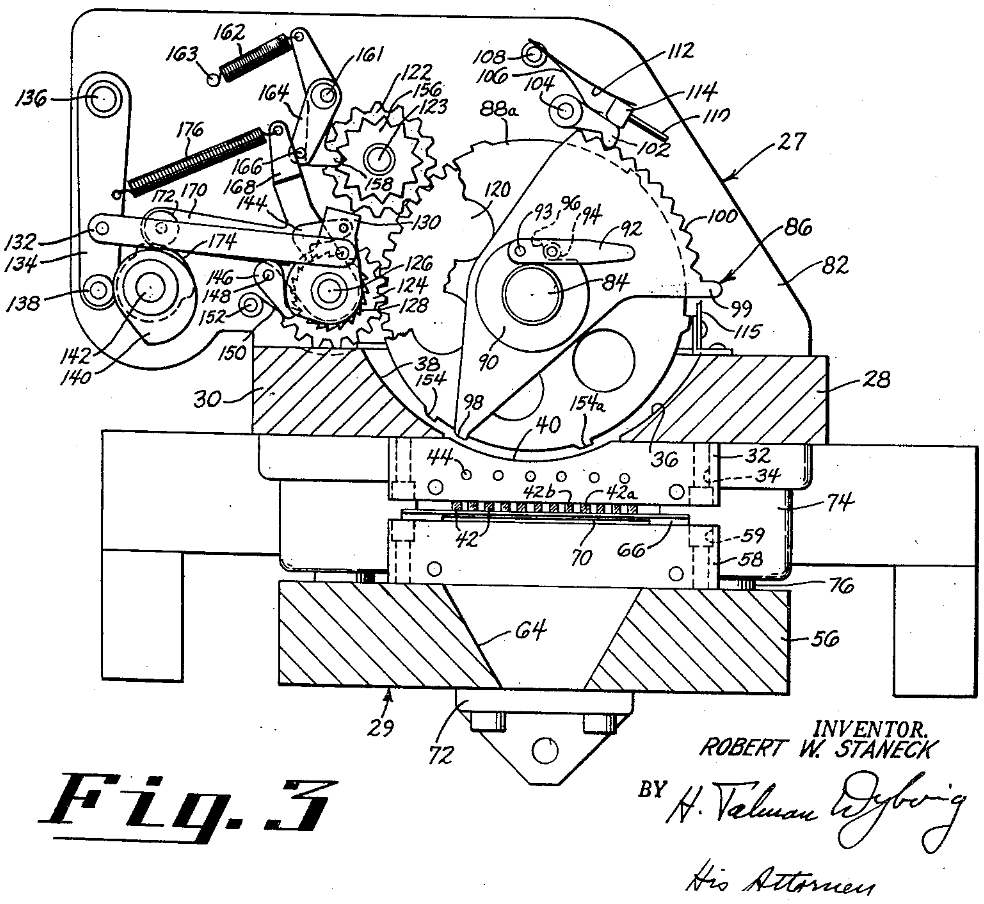
FIGURE 3 is an end elevation sectional view taken substantially along the line 3—3 of FIGURE 2.
Figure 2:
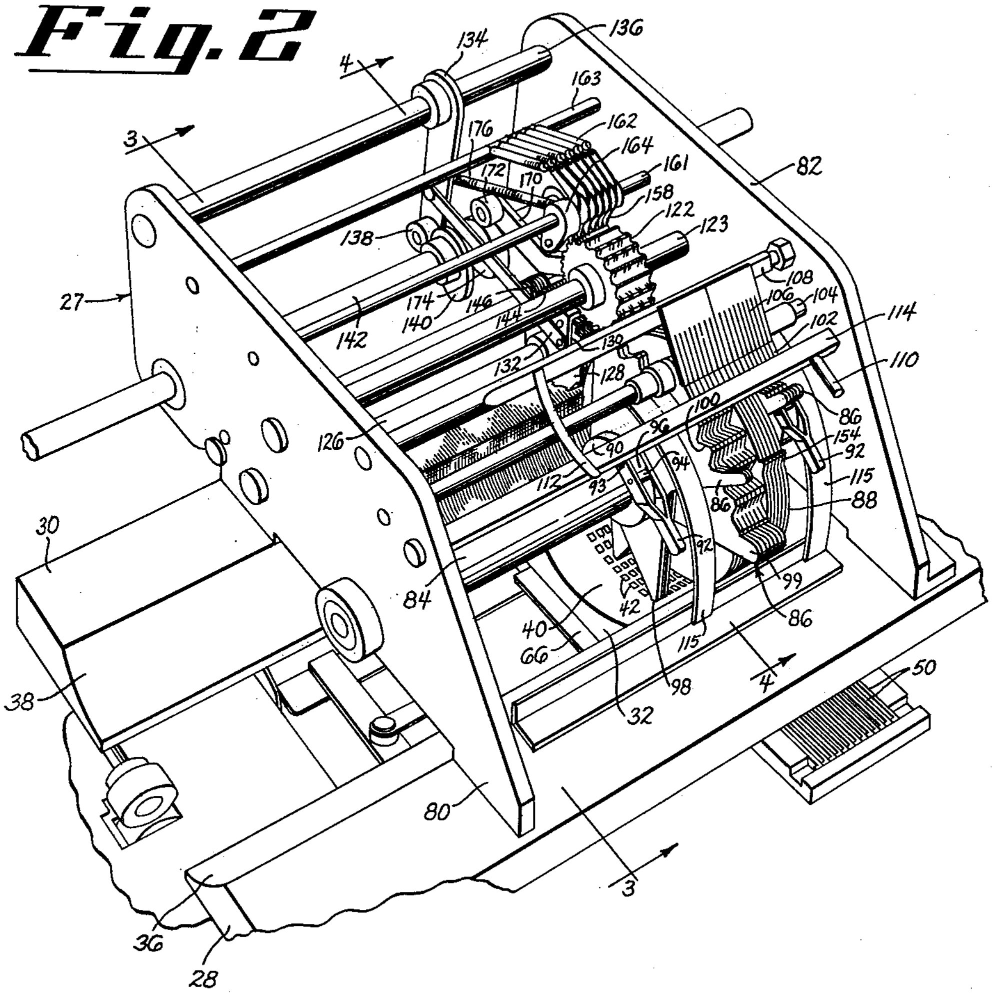
FIGURE 2 is a fragmentary perspective view drawn to an enlarged scale illustrating an upper portion of the cabinet of FIGURE 1 with dust covers removed.
Figure 4:
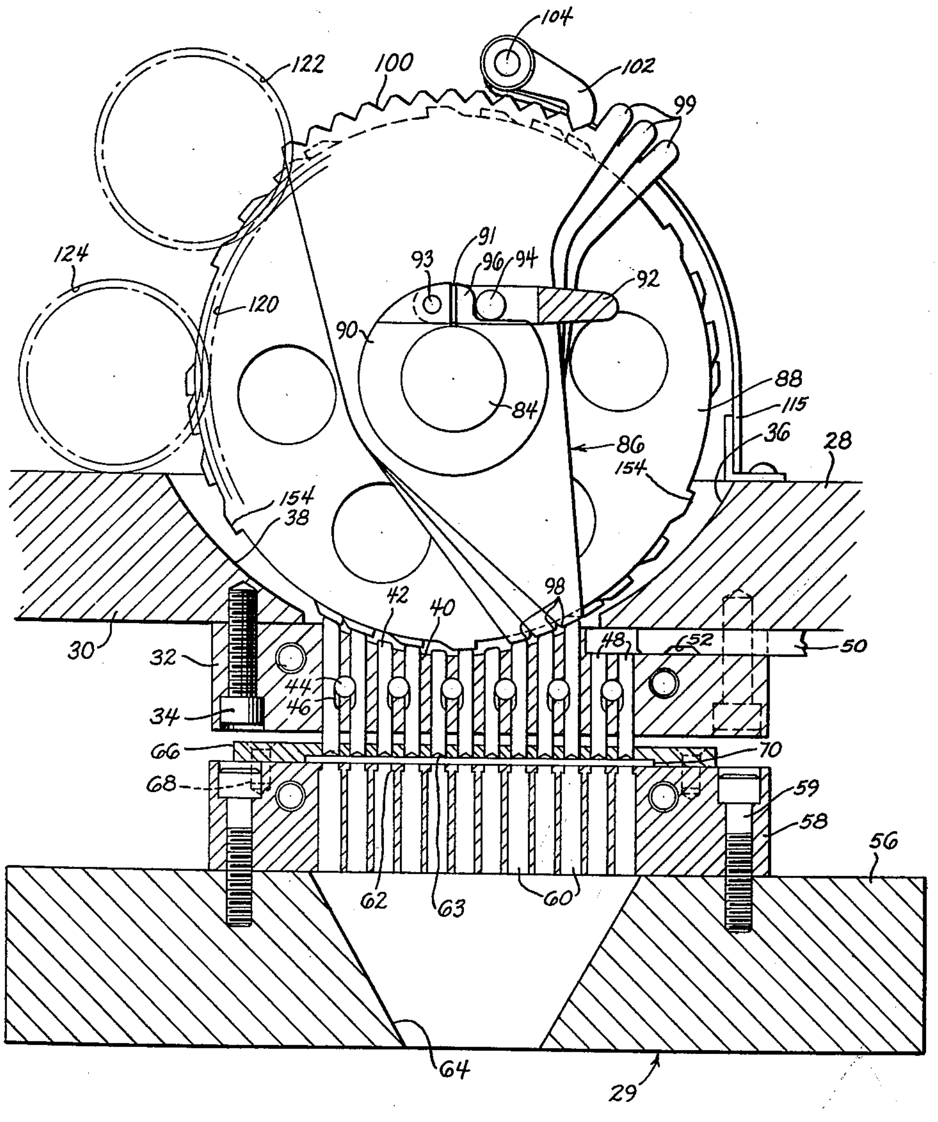
FIGURE 4 is a sectional view taken substantially along the line 4—4 of FIGURE 2.

The punch mechanism housed by the cabinet 10 is illustrated in FIGURES 2, 3, and 4. Essentially, the punch mechanism comprises a punch assembly 27 and a die assembly 29 which are brought into coaction to effect the punching operation. The punch assembly 27 is mounted upon parallel support beams 28 and 30 which are a part of the framework for the cabinet 10.

Referring to FIGURE 3, it will be seen that the punch assembly 27 includes a punch guide assembly 32 fixedly mounted to the underside of the support beams 30 by means of screw elements 34. This assembly comprises a series of laminated plates, each plate retaining one row of punches. The upper surface of the guide assembly 32 has a region of concave curvature, as illustrated at 40, which cooperates with concavely curved margins 36 and 38 in support beams 28 and 30, respectively, to form a well for an interposer mechanism to be described subsequently.

As best seen in FIGURE 2, a plurality of punch elements or plunger elements 42 arranged in an orderly array of rows and columns passes downwardly through the concavely curved portion of the guide assembly 32. FIGURE 4 illustrates a single column of the punch elements 42. Each of these punch elements is provided with an axially extending recess or niche 46 which accommodates a rod 44 passing horizontally through the guide assembly 32, adjacent pairs of punch elements 42 engaging a single rod 44. The rods 44 prevent complete withdrawal of the punch elements 42 from the guide assembly 32 while the niches 46 permit limited longitudinal sliding movement of the punch elements 42 in the guide assembly 32.

Twelve punch elements are illustrated in a single column in FIGURE 4. Of these twelve, ten have their lengths adjusted so that when their lowermost or forward ends occupy a common horizontal plane, their uppermost or rearward ends define a circular arc concentric with the concavely curved portion 40 of the guide assembly 32. The significance of this construction will become more apparent subsequently.

The remaining two punch elements, specifically identified with the reference numeral 48, each have the same length. A horizontal slide 50 is seated in the upper part of the guide assembly 32 for the purpose of controlling upward movement of the punch elements 48. This slide 50 is provided with a recess 52 such that either one or both of the punch elements 48 may be locked against upward movement in the guide assembly 32. It will become more apparent from the description which follows that the punch elements 48 will be effective to punch a hole when locked, and ineffective when unlocked by the slide 50. The use of these punch elements 48 depends upon the particular code system employed and for the purposes of the present invention, the presence of the punch elements 48 is incidental. Accordingly, no further attention is given to these punch elements.

Turning attention to the die assembly 29, this assembly comprises a die holder 56 and a die 58 mounted thereon to serve as a punch receptacle. The die 58 is secured to the die holder 56 by means of threaded screw elements 59 and is provided with an array of holes 60 arranged in rows and columns corresponding to the arrangement of punch elements in the punch assembly 27. The arrangement is such that the punch elements 42 in the punch assembly 27 will enter the holes 60 in the die assembly 29 when the punch and die assemblies are actuated one toward the other. The upper ends of the holes 60 precisely match the lower ends of the punch elements 42 such that the punch elements will effect a shearing action upon entering the holes 60. To facilitate such shearing action, the punches 42 each have a V-notch at their forward end as seen at 63 in FIGURE 4.

A short distance below the top thereof each hole 60 increases in width as illustrated at 62 so that material which has been punched upon entry of the punch elements into the holes will fall freely through the holes. Below the holes 60 the die holder 56 is provided with a tapered chute 64 for conveying the punched material to a suitable receptacle, not shown.

Mounted on top of the die 58 by means of threaded screw elements 68 is a stripper 66. This stripper is provided with a rectangular array of apertures through which the punch elements 42 may pass. The under side of this stripper is offset as illustrated at 70 to provide a channel through which a card or other item to be punched may be fed. The stripper is thus duo-functional. Firstly, it serves as a guide for guiding a card to be punched into position under the punch elements, and secondly, it functions to strip the card from the punch elements as the punch and die assemblies 27 and 29 separate.

In FIGURE 3 a bracket 72 is illustrated on the under side of the die holder 56. Mechanism which will be described subsequently engaging the bracket 72 is employed to actuate the die assembly 29 reciprocally up and down to bring it repeatedly into coaction with the punch assembly 27, thereby to effect the punching operation. To insure that the die assembly 29 will move into coaction with the punch assembly 27 with precision, a bushing 74 illustrated in FIGURE 3 is secured fixedly to the beams 28 and 30 which support the punch assembly 27. Guide posts 76 reciprocating in the bushing 74 maintain precise alignment between the punch and die assemblies 27 and 29.

Returning attention to the punch assembly 27, an interposer or restrainer mechanism for selecting which of the several punches will be operative in each punching operation will now be described. As illustrated in FIGURE 2, two upright frame members 80 and 82 are mounted fixedly above the parallel support beams 28 and 30. These frame members serve as journal blocks for supporting a plurality of parallel shafts, among which is a shaft 84 supported nonrotatably directly above the concave portion 40 of the guide assembly 32.

A plurality of interposer members 86 and 88 are mounted for rotation on the shaft 84. These interposer members are secured against axial movement on the shaft 84 by collars 90, one of which is illustrated in detail in FIGURE 4. This collar is split as illustrated at 91. Pivoted at 93 on one side of the split 91 is a lever 92 carrying a roller 94. On the opposite side of the split is a cam surface 96 which is engaged by the roller 94 to clamp the collar on the shaft 84. This lever arrangement affords a quick means of loosening the interposer members 86 and 88 for repair or rearrangement.

As best seen in FIGURE 3, each interposer member 86 includes a tapered interposer finger 98, an outwardly projecting operating lever 99, and an arcuate ratchet portion 100 opposite the finger 98. By movement of the operating lever 99, the interposer finger 98 may be positioned behind any one of ten punch elements 42 arranged in a column coplanar therewith. Movement of each interposer member 86 is restricted by means of a pawl 102 engaging the ratchet portion 100, there being one pawl 102 for each interposer member 86. The several pawls 102 are mounted on a shaft 104 journalled between the frame members 80 and 82. Each pawl is biased against its associated ratchet portion 100 by one tooth of a spring comb 106 mounted on a shaft 108 and secured against rotation thereon.

Additionally, each pawl 102 may be positively locked at a selected position in its associated ratchet portion 100 by means of a locking bar 114 mounted for rotation between the frame members 80 and 82. Locking bar 114 may be pivoted between operative and inoperative positions by means of an operating lever 110 and is loosely retained in either of its two positions by means of a spring 112 secured nonrotatably to the shaft 108.

From the foregoing it will be understood that the interposer members 86 afford a means for manually selecting which punch element in each of several columns of the matrix of punch elements 42 will be operative in any given punching operation. Suitable indicia mounted on conveniently located scales 115 may be employed to indicate which of the punch elements in the several columns involved will be operative.

These interposer members 86 are employed for what will be called repetitive punching. Thus in punching a code into a series of cards, the interposer members 86 may be employed to repeatedly punch the same information into each card. When a given series has been completed, the lock bar 114 may be pivoted to an inoperative position to enable movement of the repetitive interposer members 86 to new positions preparatory to punching a new series of cards.

With the interposer mechanism illustrated in the present drawings, specific columns in the matrix of punch elements are set aside for repetitive punching as described, and as will appear more fully in the following, other columns in the matrix are set aside for consecutive punching.

Turning now to the interposer members 88, each of these is generally a circular disc as best seen in FIGURES 3 and 4. A single disc 88a is illustrated in FIGURE 3. Integral with or secured to this disc 88a is a gear 120 which meshes with a pair of smaller gears 122 and 124 coplanar therewith. Gear 122 is mounted rotatably on a shaft 123 extending between frame members 80 and 82. Gear 124 is mounted rotatably on a shaft 126 also extending between frame members 80 and 82.

Integral with or secured to the gear 124 is a ratchet wheel 128. Adjacent this ratchet wheel 128 is a rocker arm 130 also journalled for rotation on a shaft 126. This rocker arm 130 is pivotally connected by means of a link 132 to a cam follower arm 134 pivoted on a shaft 136 extending between the frame members 80 and 82. Cam follower arm 134 carries a roller 138 which rides on the periphery of a cam 140. This cam 140 is mounted fixedly on a shaft 142 extending between the frame members 80 and 82. This cam has a single hump such that each 360° of rotation of the shaft 142 will oscillate cam follower arm 134 through a single cycle. This causes rocker arm 130 to pivot to and fro through a single cycle.

As viewed in FIGURE 3, counterclockwise pivotal movement of the rocker arm 130 is transferred to the gear 124 through the medium of a pawl 144 engaging the ratchet wheel 128. The pawl 144 is biased against the ratchet wheel 128 by a spring 145 illustrated in FIGURE 5. During the clockwise stroke of the rocker arm 130 a pawl 146 pivoted on a shaft 148 extending between the frame members 80 and 82 engages the ratchet wheel 128 so as to restrain reverse rotation of the gear 124. This pawl 146 is biased against the ratchet wheel 128 by means of a spring 150 mounted on a shaft 152 extending between the frame members 80 and 82.

The interposer member 88*a* has six lobes or abutment portions 154 protruding at equal angular positions from the periphery thereof. One of the lobes designated by the number 154*a* is interposed behind one of the coplanar punch elements designated by the reference numeral 42*a*. The arrangement of gears and cams associated with this interposer member is such that a full 360° rotation of the shaft 142 will result in rotation of the interposer member 88*a* in the clockwise direction through a small angular increment so as to advance the lobe 154*a* to a new position behind the next punch element, designated by the reference numeral 42*b*. With ten successive 360° revolutions of the shaft 142, a lobe 154 can be advanced successively through ten positions, one behind each of the ten punch elements 42 forming a column coplanar with the interposer member 88*a*.

The dimensional relationship between the lobes 154 in the interposer member 88*a* and the punch elements 42 coplanar therewith is as follows.

Two adjacent lobes 154 in the periphery of the interposer member 88*a* subtend an angle of 60°. The ten coplanar punch elements 42 subtend an angle of approximately 54°. Thus, when one of the lobes 154 on the interposer member 88*a* is advanced beyond the tenth or final punch element 42 in the coplanar column of punch elements, a new lobe 154 advances behind the first punch element in the column. In consequence of this construction, an interposer lobe 154 is positioned behind one of the punch elements 42 in the coplanar column at all times. With successive revolutions of the shaft 142, the lobes 154 in the interposer member 88*a* move successively from the first punch element 42 in the coplanar column to the last punch element 42 in the coplanar column.

Means for actuating a single interposer member 88*a* so as to advance interposer lobes 154 thereon behind successive punch elements in a column of punch elements coplanar therewith has been described. The interposer member 88*a* changes position once with each revolution of the shaft 142; and, as will be described subsequently, a punching operation also occurs once with each revolution of the shaft 142. Accordingly, the punch element selected by the interposer member 88*a* changes once after each punching operation. Assuming cards successively punched by the present mechanism are to be punched in code with a consecutively increasing serial number, the column of punch elements restrained by the interposer member 88*a* will correspond to the "units" digit of the serial number. An adjacent column of punch elements controlled by a different interposer member 88 is used to punch the "tens" digit, and still another column of punch elements controlled by still a different interposer member 88 is used to punch the "hundreds" digit, and so on. To effect serial punching of this type, mechanism for transferring the rotation of one interposer member 88 to the next interposer member 88 in a predetermined ratio is required. This mechanism will now be described with reference to FIGURE 5.

This figure illustrates in detail the pawl element 144, ratchet wheel 128, and gear 124 which rotate the "units" interposer member 88*a*. Adjacent interposer members 88 governing the "tens," "hundreds," etc., digits of the serial number are engaged by similar gears 124 having similar ratchet wheels 128 integral therewith. A plurality of interconnected pawls 144 operate in unison to rotate the several gears 124 in the proper sequence, there being one pawl for each gear 124.

Figure 5:
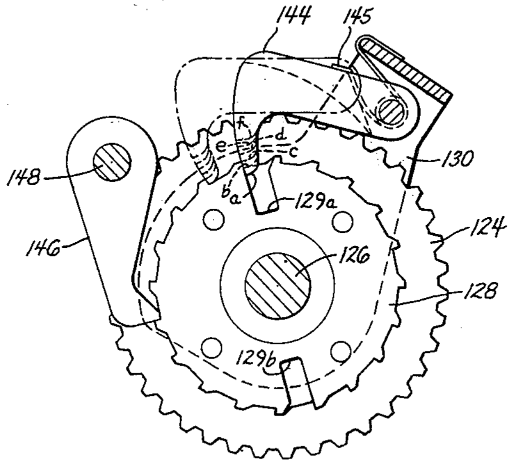
FIGURE 5 is an enlarged detail view of a portion of FIGURE 3 illustrating two positions of a counting mechanism employed in association with the interposer mechanism of this invention.

These pawls and gears are not individually visible in FIGURE 5 since they are stacked one behind the other when viewed from that direction. However, it can be observed in FIGURE 5 that the forward tips of the several pawls terminate at different elevations. Thus the tips *a, b, c, d, e,* and *f* of six pawls 144 appear in the figure. These six pawls relate to the "units," "tens," "hundreds," "thousands," "ten thousands," and "hundred thousands" digits of a six digit serial number.

The pawls are shown in two positions in FIGURE 5, one broken line and one solid line. In the broken line position the pawls are in an extreme counterclockwise position after advancing the ratchet wheels 128 in a counterclockwise direction through an increment corresponding to one notch in the ratchet wheels. In the solid line position, the pawls are returned to an extreme clockwise position preparatory to advancing the ratchet wheels 128 another increment. In the broken line position the tip *a* of the "units" pawl engages a shallow notch in the "units" ratchet wheel 128. Due to this interengagement, the remaining interconnected pawls, the tips of which are at a higher elevation, are prevented from engaging their respective ratchet wheels.

FIGURE 5 illustrates two diametrically disposed deep notches 129*a* and 129*b* in the ratchet wheel 128. These deep notches are separated by nine shallower notches, such that every tenth notch in the periphery of the ratchet wheel 128 is deep. Thus the tip *a* of the "units" pawl will drop into an extra deep notch 129 once each ten notches. When this happens, the tip *b* of the "tens" pawl will be permitted to engage the "tens" ratchet wheel and thereby advance that ratchet wheel one increment. It follows that the "tens" ratchet wheel advances one increment for every ten increments advanced by the "units" ratchet wheel. A similar relationship exists between the "tens" and "hundreds" ratchet wheels, between the "hundreds" and "thousands" ratchet wheels, and so on.

One increment on each of the ratchet wheels 128 corresponds to an angular rotation of 6° for the associated interposer member 88. This conforms with a 6° center to center separation between punch elements in each column of punch elements. As a result of this arrangement, continuous rotation of any one of the ratchet wheels 128 will cause the associated interposer member 88 to move successively behind the several punch elements 42 in the column coplanar therewith.

Recalling that the pawls 144 are actuated through one cycle of movement for each 360° rotation of the shaft 142, it is evident that as the shaft 142 rotates successively through several revolutions, the interposer members 88 will be advanced to interpose consecutively behind selected punch elements 42 to effect serial punching of a coded number.

The present interposer mechanism offers a distinct advantage in that it is fast operating and requires only low inertia movements for consecutive punching. Thus, each successive change in the digital information presented to the punch cards involves only a 6° rotation of one or more interposer members 88 and a corresponding 18° rotation of one or more of the ratchet wheels 128. Since these movements are small, the interposer mechanism can be characterized as a low inertia system.

Furthermore, since it is not necessary to reset any of the interposer discs during a consecutive run, no time delay for resetting is needed and the interposer mechanism can operate at great speed.

An electrically controlled clutch mechanism to be described subsequently is employed for continuously rotating the shaft 142 through successive 360° revolutions. In this regard it is to be noted in FIGURE 3 that a portion of the cam 140 fixed to the shaft 142 is nearly truly circular, such that the interposer members 88 remain stationary or idle for a limited portion of each revolution of the shaft 142. In other words, the operation of the interposer members is actually intermittent while the operation of the shaft 142 is normally continuous. During the idle period for the interposer members, the punch and die assemblies 27 and 29 are brought into coaction to effect a punching operation and then separated. The following mechanism is provided to insure that the interposer members 88 are positively locked in their idle position during the punch operation.

Each interposer member 88 is engaged by a gear 122, as noted previously. Integral with or secured to each gear 122 is a ratchet wheel 156. Each ratchet wheel 156 is engaged by a pawl 158 mounted pivotally on a shaft 161 extending between the frame members 80 and 82. Springs 162 anchored to a shaft 163 extending between the frame members 80 and 82 urge the pawls 158 against their respective ratchet wheels 156.

Also pivoted on the shaft 161 is an arm 164 supporting a pin 166 positioned to engage the outermost pawl 158 associated with the units column in the punch matrix. An arm 168 pivotally mounted on a shaft 126 engages the pin 166. Forking angularly from the arm 168 is a cam follower arm 170 carrying a roller 172 engaging a cam 174 fixedly secured to the shaft 142. A spring 176 extending between the cam follower arm 134 and the arm 168 biases the cam follower 134 and the cam follower arm 170 against their respective cams. It will be observed that the cam 174 is provided with a single hump of limited circumferential extent.

It is to be noted in FIGURE 3 that the cams 140 and 174 are so related for counterclockwise movement of the shaft 142 that, when the roller 138 is at the beginning of the circular arc on the cam 140, the roller 172 is at the beginning of the hump on the cam 174. Thus, during the period of idleness of the interposer members 88, the arm 168 is pivoted in a clockwise direction against the pin 166 to lock the outermost pawl 158 against its corresponding ratchet wheel 156 thereby locking the associated interposer member 88 against rotation. This effectively locks the interposer mechanism. With continued counterclockwise rotation of the shaft 142 the roller 172 eventually drops off the hump on the cam 174 releasing the outermost pawl 158 and thereby freeing the associated interposer member 88 for rotation. At the same time, roller 138 commences clockwise movement as dictated by the cam 140 to set the interposer members 88 to a new position. As a result of this arrangement, the interposer members 88 are locked only when not being advanced to new positions by operation of the cam 140.

Figure 6:
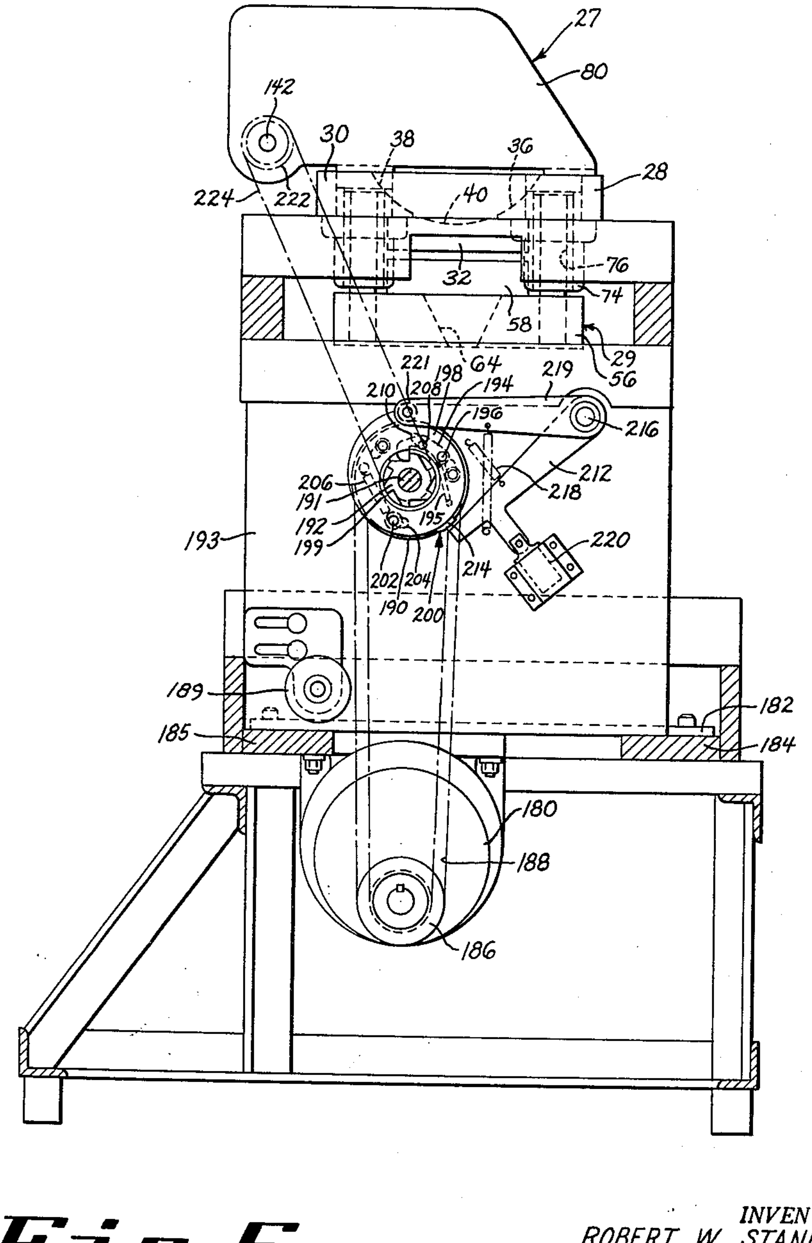
FIGURE 6 is a sectional view taken substantially along the line 6—6 of FIGURE 1, portions having been removed for simplification.
Figure 7:
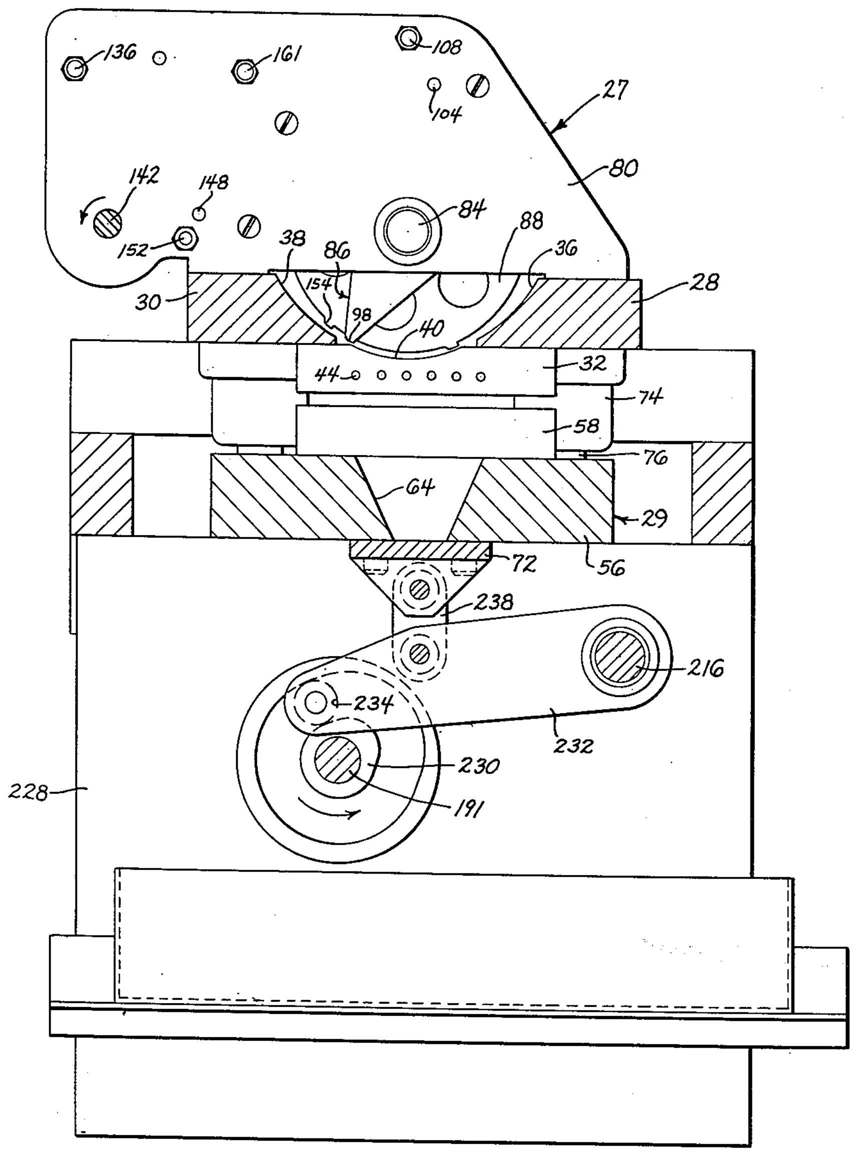
FIGURE 7 is a sectional view taken substantially along the line 7—7 of FIGURE 1, portions having been removed for simplification.

Mechanism for driving the punch and die assemblies 27 and 29 to effect a punching operation synchronously with operation of the interposer mechanism to select the specific code to be punched is illustrated in FIGURES 6 and 7. Turning to FIGURE 6, there is illustrated a motor 180 suspended below straps 182 engaging parallel supporting beams 184 and 185 which are part of the inner framework of the cabinet 10. The motor 180 drives a pulley 186 which drives another pulley 190 through the agency of a belt 188. A conventional slack take-up 189 regulates tension in the belt 188.

The pulley 190 is secured fixedly to a ratchet wheel 192 journalled for rotation on a shaft 191. The shaft 191 is supported for rotation by an upright steel plate 193. The ratchet wheel 192 is adapted to be engaged by a pawl 194 pivotally mounted on a pin 196 secured to a drive plate 198. A spring 195 anchored to the drive plate 198 biases the pawl 194 toward the ratchet wheel 192. The drive plate is rotatably mounted with respect to the ratchet wheel 192 with the aid of a sleeve 199 secured thereto. A suitable opening in this sleeve permits the pawl 194 to move into engagement with the ratchet wheel 192. When the pawl and ratchet wheel are engaged, the drive plate 198 is moved in a counterclockwise direction, as viewed in FIGURE 6.

Interposed between the drive plate 198 and the pulley 190 is a cam plate 200. This cam plate, like the drive plate 198, is mounted for rotation about the ratchet wheel 192. The drive plate 198 carries three equispaced pins 202 which project into arcuate slots 204 in the cam plate 200. As a result, the cam plate 200 is permitted only limited rotational freedom with respect to the drive plate 198.

A pin 208 mounted on the pawl 194 engages an inclined slot 210 in the cam plate 200. A spring 206, anchored at one end to the cam plate 200 and at the other end to one of the pins 202 of the drive plate, biases the cam plate counterclockwise with respect to the drive plate. This counterclockwise bias operating through the slot 210 supplements the bias of the spring 195 in urging the pawl 194 into engagement with the ratchet wheel.

The cam plate 200 has an outwardly projecting lug 214 at the periphery thereof. This lug is adapted to be engaged with an arm 212 mounted pivotally at 216. A spring 218 biases the arm 212 in the clockwise direction and in its extreme clockwise position, the arm 212 will engage the lug 214 to interrupt rotary motion of the cam plate 200. A solenoid 220 is provided for overriding the spring 218 to move the arm 212 out of engagement with the lug 214 on the cam plate 200.

With the solenoid 220 energized so as to draw the arm 212 away from the cam plate 200, spring 206 is effective to bias the cam plate 200 relative to the drive plate 198 so as to urge pawl 194 into engagement with ratchet wheel 192. To insure that the action of spring 206 results in forward rotation of the cam plate 200 and not reverse rotation of the drive plate 198, the drive plate is restrained by an arm 219 carrying a roller 221 riding the periphery of the drive plate 198. This periphery has an abrupt shoulder which engages the roller 221 to prevent reverse rotation of the drive plate 198. With the pawl 194 engaging the ratchet wheel 192, the motor 180 rotates the drive plate 198. Means not shown connect the drive plate 198 to the shaft 191, so that this shaft also rotates.

When the solenoid 220 is de-energized, spring 218 draws arm 212 against the periphery of cam plate 200 and ultimately, rotation of the cam plate is arrested by engagement of the lug 214 thereon. When this happens, the drive plate 198 and shaft 191 continue rotation by virtue of their own momentum, within the limits permitted by the pins 202 engaging slots 204. This continued rotation extends spring 206, and, at the same time, drives pawl 194 out of engagement with the ratchet wheel 192. Ultimately, the rotation of shaft 191 and drive plate 198 is halted by contact between the pins 202 and the extreme counterclockwise ends of the slots 204. The shaft 191 then remains at rest until the solenoid 220 is once again energized.

From the foregoing description it is apparent that the solenoid 220 controls rotation of the shaft 191. For normal operation, this solenoid remains energized and the shaft 191 rotates continuously.

Rotation of the shaft 191 is transmitted to the shaft 142 through the agency of a chain 224 engaging a sprocket 222 fixed to the shaft 142. This shaft 142 is the main driving shaft for the interposer mechanism hereinbefore described. One full revolution of the shaft 191 results in one full revolution of the shaft 142 and thereby produces one cycle of operation of the interposer mechanism.

The mechanisms for actuating the punch and die assemblies 27 and 29 is illustrated in FIGURE 7. In this figure, there is illustrated an extension of the shaft 191 which is journalled in an upright bearing plate 228. Mounted on the shaft 191 is a cam 230. This cam is engaged by a follower arm 232 provided with a roller 234. The follower arm 232 is pivotally mounted on an extension of the shaft 216 (see FIGURE 6).

The shape of the cam 230 is such that the follower arm 232 is actuated approximately vertically once for each revolution of the shaft 191. This vertical movement of the follower arm 232 is transmitted to the die assembly 29 of the punch mechanism through the agency of a link 238 engaging the bracket 72 mounted under the die holder 56 of the lower die assembly 29.

It has already been described that a single revolution of a shaft 191 drives the interposer mechanism through one cycle of its operation. Similarly, a single revolution of the shaft 191 drives the punch and die assemblies 27 and 29 through one cycle of their operation.

It has been described that the operation of the interposer mechanism is controlled by a cam 140 on the shaft 142. The relationship between this cam 140 and the cam 230 is such that the interposer mechanism operates only when the lower die assembly 29 is disengaged from the upper punch assembly 27. This insures that the interposer mechanism will not be jammed by upwardly projecting punch elements 42. In this regard, it will be observed that the lobes 154 on the circular interposer members 83 have sloping forward margins. These sloping margins serve to cam downwardly any punch elements 42 that may not have fallen downwardly as the punch and die assemblies 27 and 29 separated.

In the foregoing, means for continuously driving both the punch mechanism and the interposer mechanism of this invention have been described. The cards which are to be punched are advanced through the machine by a feed mechanism which derives power from the shaft 142. As a result, the cards are fed in synchronism with the movement of the punch and die assemblies and of the interposer mechanism. This card feed mechanism has not been shown in detail for the reason that it is of conventional design and illustration thereof would merely obscure the invention. It suffices to say that proper movement of a card which is to be punched into position between the punch and die assemblies 27 and 29 precludes triggering of a detector switch (not shown) which otherwise de-energizes the solenoid 220. This permits one cycle of machine operation during which a punched card is removed from between the punch and die assemblies 27 and 29 and a new card is inserted therebetween. Insertion of the new card automatically continues the machine operation. In the event a card fails to feed properly between the punch and die assemblies, the aforementioned detector switch de-energizes the solenoid 220 and thereby interrupts operation of the machine.

In the foregoing, apparatus for serially punching a series of cards with holes which convey digital information has been described. It is to be understood, of course, that this same apparatus may be used to punch coded information into other than the conventional paper or pasteboard cards. It is also to be understood that with only slight modification in the punch elements, the apparatus disclosed may be used to print or impress the coded information onto a card or the like. Such modification is deemed within the scope of the present invention.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a mechanism for punching cards to provide consecutive digital information thereto, the cards being fed to the mechanism in seriatim relation, a column of punch members, a rotary interposer member having a plurality of spaced apart lobes each of which is engageable with any one of the punch members of said column, unidirectionally operated means to rotate said interposer member to advance its lobes successively along said column of punch members, the lobes being spaced apart a distance equal to at least the length of said column so that at any given time only one lobe is engageable with the punch members in said column, and means for producing relative reciprocal movement between a card and the punch members to punch the card.

2. In a mechanism for punching cards to provide consecutive digital information thereto, the cards being fed to the mechanism in seriatim relation, a pair of columns of punch members, a first rotary interposer member having a plurality of spaced apart lobes each of which is engageable with any one of the punch members in one of said columns, the lobes being spaced apart a distance equal at least to the length of said one column of punch members so that at any given time only one lobe is engageable with the punch members in said one column, a second interposer member having a lobe engageable with any one of the punch members in the other column, first means for rotating said first interposer member to advance its lobes successively along said one column of punch members, second means responsive to said first means for rotating said second interposer member to advance the lobe thereof along said other column of punch members in proportion to the movement of said first interposer member, and means for producing relative reciprocal movement between a card and the punch members to punch the card.

3. A mechanism for providing consecutive digital information to successive elements which are supplied thereto in seriatim relation, said information being supplied to said elements by application of pressure thereto, comprising an impression unit including a plurality of individual plunger members, rotary restrainer means provided with a plurality of spaced apart abutment portions, means causing unidirectional rotary movement of the restrainer means to position any abutment portion thereof in alignment with any of the individual plunger members for engagement therewith, and means for producing relative movement between an element and said impression unit to press said element against the plunger members for application of the digital information thereto.

4. In a mechanism for providing consecutive digital information to elements supplied thereto in seriatim relation, holder means for retaining an element during operation thereupon, a punch unit comprising a column of individually movable punch members, each of the punch members being engageable with the element which is retained by said holder means, a rotary interposer member for said column of punch members, said interposer member having a plurality of spaced apart lobes each of which is engageable with any one of said column of punch members, means providing unidirectional rotary movement to the interposer member so as to advance said lobes successively along said column of punch members, means for producing relative movement between the punch unit and the holder means so that a punch member of said column which is engaged by a lobe of the interposer member is firmly forced against the element while the remaining punch members which are not engaged by a lobe are moved by the element.

5. In a mechanism for providing consecutive digital information to elements supplied successively thereto, holder means supporting an element during operation thereon, a punch unit comprising a column of individually movable punch members, each of the punch members being engageable with the element which is supported by said holder means, a rotary interposer member for said column of punch members, said interposer member having a plurality of lobes spaced apart a distance equal at least to the length of said column of punch members, means providing unidirectional rotary movement to the interposer member to advance each of said lobes successively along said column of punch elements, and means for producing relative movement between the punch unit and the holder means so that a punch member which is engaged by a lobe of the interposer member is firmly forced against the element while those punch members which are not engaged by a lobe move with the element.

6. In a mechanism for providing consecutive digital information to elements supplied successively thereto, holder means for supporting an element during operation thereupon, a punch unit comprising a pair of columns of individually movable punch members, each of the punch members being engageable with the element which is supported by the holder means, a pair of rotary interposer members, there being one interposer member for each column of punch members, each interposer member having lobes thereon spaced apart a distance corresponding to the length of the column of punch members associated therewith, first means for rotating one of said interposer members to advance each of the lobes thereon successively along the associated column of punch members, second means responsive to said first means for rotating the other interposer member in proportion to the rotation of said one member, and means for producing relative movement between the punch unit and the holder means so that the punch members engaged by said lobes are firmly forced against the element while the punch members which are not engaged by lobes are moved by the element.

7. A mechanism for consecutively punching a series of receiver elements including a plurality of punch elements movably mounted for reciprocal longitudinal movement in an array including two parallel columns, the punch elements in each column having predetermined lengths so as to collectively define a substantially circular arc at the rearward ends thereof when the forward ends thereof abut a receiver element, actuator means for urging a receiver element against the forward ends of said punch elements to move said punch elements rearwardly, and interposer means for interrupting the rearward movement of selected punch elements to effect punching of selected areas of said receiver element, said interposer means comprising first and second rotary members, one for each column of punch elements, means supporting each of said rotary members for rotation in a plane substantially common with one of the columns of punch elements, the rotational axis of each member being substantially coincident with the geometric center of the circular arc defined by the rearward ends of the punch elements associated therewith, said members each carrying a plurality of equally spaced lobes for interposition in the path of rearward movement of the associated punch elements, the central angle subtended by adjacent lobes being at least equal to the central angle subtended by the associated punch elements, said lobes each having a radial length from their rotational axis equal substantially to the radius of the associated circular arc, means interconnecting said first and second rotary members for rotating the second member in proportion to rotation of the first, and means for intermittently rotating said first member unidirectionally to interpose the lobes thereof behind successive punch elements in the column coplanar therewith, the lobes of said second member moving intermittently behind successive punch elements in the column coplanar therewith in proportion to the movement of the lobes of said first member.

8. Mechanism for punching a receiver element including a plurality of punch elements movably mounted in a column for reciprocal longitudinal movement, said punch elements having predetermined lengths so as to collectively define a substantially circular arc at the rearward ends thereof when the forward ends thereof abut said receiver element, actuator means for urging said receiver element against the forward ends of said punch elements to move said punch elements rearwardly, and interposer means for interrupting the rearward movement of selected punch elements to effect a punching of selected areas of said receiver element, said interposer means comprising a rotary member, means supporting said member for rotation in the path of rearward movement of said punch elements, the rotational axis of said member being substantially coincident with the geometric center of the circular arc defined by the rearward ends of said punch elements, said member carrying a plurality of spaced lobes each having a radial length from the axis of rotation corresponding substantially to the radius of the circular arc defined by said punch elements, the central angle subtended by adjacent lobes being at least as large as the central angle subtended by said circular arc, and means for intermittently rotating said member unidirectionally to advance said lobes progressively behind successive punch elements.

9. The punch mechanism according to claim 8 wherein the means for intermittently rotating the interposer members operates in synchronism with the actuator means for urging the receiver element against the punch elements.

10. A mechanism for providing consecutive digital information to elements supplied thereto in seriatim relation, said information being supplied to said elements by application of pressure thereto, comprising an impression unit including a plurality of individual plunger members arranged in parallel columns, a plurality of rotary restrainer members each provided with a plurality of spaced apart abutment portions, there being one restrainer member for each column of plunger members, means to rotate each restrainer member unidirectionally to position each abutment portion thereof in alignment with any of the individual plunger members of the associated column for engagement therewith, rotary ratchet members engageable with each restrainer member to rotate same, said ratchet members each having a plurality of notches in the periphery thereof, at least one of the notches in each ratchet member being deeper than the others, drive means including a plurality of staggered pawl elements engageable with the notches of said ratchet members to rotate same in accumulating sequence to thereby position abutment portions of said restrainer members in alignment with selected of said plunger members in a predetermined sequence, and means synchronized with said drive means for producing relative movement between an element and said impression unit to press said element against the plunger members for application of digital information thereto.

11. In a rotary mechanism for accumulating digital information, a pair of rotary ratchet members of substantially equal size mounted for independent rotation, the first of said ratchet members having at least two deep notches in the periphery thereof and shallow notches spaced equally between the deep notches, the second of said ratchet members having shallow notches spaced equally on the periphery thereof, first and second pawls for engaging said first and second ratchet members, respectively, said pawls being connected for unison movement, and means for actuating said pawls against said ratchet members to rotate same, said pawls being spaced differentially with respect to said ratchet members so that said second pawl engages the notches of said second ratchet member only when said first pawl drops into a deep notch in the periphery of said first ratchet member.

12. In a rotary mechanism for accumulating digital information, a plurality of rotary ratchet members of substantially equal size mounted in parallel relation for independent rotation about a common axis, said ratchet members each having at least two deep notches in the periphery thereof and each having a plurality of shallow notches spaced equally between said deep notches, a plurality of pawls, one for engaging each ratchet member, said pawls being connected for unison movement, and means for actuating said pawls against said ratchet members to rotate same, said pawls being spaced differentially with respect to said ratchet members so that pawls remote from said ratchet members engage the notches thereof only when those pawls closer to said ratchet members drop into the deep notches thereof.

References Cited in the file of this patent

UNITED STATES PATENTS

| | | |
|---|---|---|
| 1,944,671 | Schaaff | Jan. 23, 1934 |
| 2,664,951 | Loudon | Jan. 5, 1954 |